Patented Jan. 23, 1940

2,187,820

UNITED STATES PATENT OFFICE 2,187,820

SEPARATION OF AROMATIC AMINES FROM IRON SLUDGE

Hans Z. Lecher, Plainfield, and Robert C. Conn, Bound Brook, N. J., assignors, by mesne assignments, to American Cyanamid Company, New York, N. Y., a corporation of Maine No Drawing. Application August 11, 1938, Serial No. 224,404

10 Claims. (Cl. 202—42)

This invention relates to an improved method of recovering and purifying primary aromatic amines produced by the reduction of nitro compounds with iron.

Many aromatic amines are obtained by the reduction of the corresponding nitro compounds with finely divided iron. In fact, this is a general process used in producing a large number of aromatic amines such as aniline, toluidine, phenylene diamines, various substituted anilines, alpha naphthylamine, and the like. In general, the reduction is effected with the addition of a relatively small amount of acid to the mixture containing the nitro compound and the finely divided iron. The amount of acid is only a fraction of that required to correspond theoretically with the amine formed. As a result, most of the iron is transformed into iron oxides which with some unreduced iron forms a sludge from which the amine has to be recovered.

There are in general three methods of recovering amines. One is by separating an aqueous solution of the amine from the iron sludge. This is applicable only to readily soluble amines such as the phenylene diamines. The second is by steam distillation, and the third is by extraction with organic solvents. The first method is applicable only to water soluble amines and cannot, therefore, be used with the great majority of the amines such as aniline, substituted anilines, etc. The third method is unsatisfactory because serious emulsions result, or if the whole mixture is vaporized under a vacuum prior to the extraction unsatisfactory results are also obtained. The second method is the one in most common use and while it gives fair results with easily volatile amines such as aniline, it is not satisfactory with amines having a relatively high boiling point such as, for example, alpha naphthylamine, because superheated steam is required and the high temperature results in decomposition which lowers the yield of the amine. Difficulty is also encountered because the iron sludge residue remaining in the still is pyrophoric and introduces considerable fire hazard due to spontaneous combustion at the elevated temperature prevailing in the still.

According to the present invention, the reaction mixture is first subjected to azeotropic distillation with a water immiscible organic solvent. The distillation removes water and when dehydration is complete the solution of the amine in the organic solvent can be readily removed from the iron and iron oxides because the latter is dry and powdery and does not prevent any filtration problem. The amine can be crystallized from the solvent either directly by cooling or after the solution has first been concentrated under reduced pressure, or all of the solvent may be stripped off. Another simple method consists in the precipitation of the salt of the amine by introduction into the solution of an inorganic acid such as hydrochloric acid.

The choice of solvents is a very wide one. Most of the organic solvents for amines which are not miscible with water and which have a sufficient vapor pressure (usually at least 5 mm. at 100° C.), are usable. Among the simplest and most satisfactory are toluene and monochlorobenzene, although others such as solvent naphtha may be used. The invention is not limited to the use of a particular organic solvent.

It is necessary to neutralize the acid present in the reaction mixture before treatment by azeotropic distillation. While the invention is not limited to any specific method of neutralization, we have found that the use of calcium carbonate is preferable as there is no tendency to cake the iron sludge which is somewhat of a problem when sodium carbonate is used. In a more specific aspect, therefore, the employment of calcium carbonate for neutralization is included as a preferred modification of the invention.

It is possible to add fresh amounts of organic solvent until dehydration is complete. This however, requires the use of relatively large amount of solvent, and for economic reasons, therefore, it is preferable to condense the vapors from the azeotropic distillation in a reflux condenser provided with a settling well where the water layer is drawn off and the solvent runs back into the still. This modification does not alter the operation of the distillation but introduces a marked economy of solvent.

While the present invention is particularly useful with aromatic amines having high boiling points such as, for example, those having boiling points in excess of 210° C. (under atmospheric pressure), it is applicable also to the lower boiling amines even though the latter can be recovered with fair efficiency by other methods. In the case of the high boiling aromatic amines, the present invention constitutes a simple and economical method characterized by improved yields and purer products due to the elimination of decomposition or side reactions which result when high temperature steam distillation is employed. Examples of typical commercial amines to which the present invention is especially applicable are the isomeric xylidines, m- and p- chloroanilines, the dichloroanilines, particularly the important 2,5-dichloroaniline, the anisidines and phenetidines, chlorinated toluidines such as 2-methyl-5-chloroaniline, chlorinated alkoxy anilines such as 2-methyl-5-chloro aniline, alpha-naphthylamine, etc. The invention is, however, not limited to these particular aromatic amines and is generally applicable to other high boiling aromatic amines and even to lower boiling amines such as aniline and toluedenes, etc., although the economic advantage with these lower boiling amines is not as great.

The invention will be described in conjunction with the following specific examples which illustrate typical embodiments of the invention without limiting it to the details therein set forth:

In the following examples the parts are by weight.

*Example 1*

A mixture of 100 parts of iron filings and 170 parts of water containing 3.4 parts of glacial acetic acid is heated to 95° C. and 54.5 parts of 2-nitro-4-chloroanisole are added over 30 minutes with good stirring. Stirring and heating are continued until reduction is complete.

The reduction mixture is neutralized by the addition of 10 parts of calcium carbonate. 100 parts of toluene are added and while good stirring is maintained, the temperature is raised until the azeotropic mixture of toluene-water distills. The distillate is collected in a suitably constructed settling well, so arranged that the toluene is continuously returned to the reaction vessel and the water removed. Distillation is continued until no more water is present in the distilling mixture. The hot solution of 2-methoxy-5-chloroaniline in toluene is then filtered from the dry, powdery iron residue. This is washed twice on the filter with hot toluene, 86 parts of toluene being taken for each washing.

The combined filtrate and washings are concentrated by distillation, 180 parts of toluene being distilled. The remaining solution is cooled, whereupon 2-methoxy-5-chloroaniline is crystallized out and removed by filtration. The toluene mother liquor is then available for use in another run.

*Example 2*

140 parts of iron filings and 90 parts of water are heated to 95° C. with good stirring and 14 parts of 23° Bé. hydrochloric acid added. 100 parts of 2-nitro-4-chlorotoluene are then added over thirty minutes and heating and stirring continued until reduction is complete.

The reduction mixture is then neutralized by the addition of 30 parts of calcium carbonate. 170 parts of chlorobenzene are added and the temperature raised, with good stirring, until the azeotropic mixture of chlorobenzene-water distills. The distillate is collected in a settling well, the water removed, and the chlorobenzene returned to the reduction mixture. Distillation is continued until no more water is present in the distilling mixture. The hot solution of 2-methyl-5-chloroaniline in chlorobenzene is then filtered from the dry powdery iron residue and this is washed twice with hot chlorobenzene, 86 parts being taken for each washing.

The hydrochloride of 2-methyl-5-chloro-aniline is easily isolated by adding a slight excess of 23° Bé. hydrochloric acid to the combined filtrate and washings, allowing the precipitated hydrochloride to settle, and then filtering.

*Example 3*

150 parts of iron filings, 300 parts of water and 10 parts of 23° Bé. hydrochloric acid are heated to 90–100° C. with good stirring and 96 parts of 2.5-dichloro-nitrobenzene added over one hour. Heating and stirring are continued until reduction is complete.

The reduction mixture is then neutralized by the addition of 8 parts of calcium carbonate. 160 parts of chloro-benzene are added and the temperature raised, with good stirring, until the azeotropic mixture of chlorobenzene-water distills. The distillate is collected in a settling well, the water removed and chlorobenzene returned to the reduction mixture. Distillation is continued until no more water is present in the distilling mixture. The hot solution of 2,5-dichloroaniline in chlorobenzene is then filtered from the dry, powdery iron residue and this is washed twice with hot chlorobenzene, 86 parts being taken for each washing.

The hydrochloride of 2,5-dichloroanile is easily isolated by adding a slight excess of 23° Bé. hydrochloric acid to the combined filtrate and washings, allowing the precipitated hydrochloride to settle and then filtering.

*Example 4*

90 parts of iron filings, 110 parts of water and 4.5 parts of 23° Bé. hydrochloric acid are heated to 90° C. with good stirring and 100 parts of alpha-nitronaphthalene are added over two hours. Heating and stirring are continued until reduction is complete.

The reduction mixture is then neutralized by the addition of 6 parts of calcium carbonate. 170 parts of chloro-benzene are added and the temperature raised, with good stirring, until the azeotropic mixture of chlorobenzene-water distills. The distillate is collected in a settling well, the water removed and the chlorobenzene returned to the reduction mixture. Distillation is continued until no more water is present in the distilling mixture. The hot solution of alpha-naphthylamine in chlorobenzene is then filtered from the dry, powdery iron residue and this is washed twice with hot chlorobenzene, 100 parts being taken for each washing.

Alpha-naphthylamine is easily recovered from the filtrate and washings by steam distilling off the chlorobenzene. It can then be purified by vacuum distillation.

We claim:

1. A method of recovering primary aromatic amines from reaction mixtures containing the amine and iron sludge which comprises neutralizing the acid used in the reaction, dehydrating the reaction mixture by a minimum boiling point azeotropic distillation with a water immiscible organic solvent having a vapor pressure of at least 5 mm. at 100° C. and being in excess of the amount required to remove all of the water, filtering the solution of the amine in the solvent from the iron sludge, and separating the amine from the filtrate.

2. A method of recovering primary aromatic amines having a boiling point of at least 210° C. from reaction mixtures containing the amine and iron sludge which comprises neutralizing the acid used in the reaction, dehydrating the reaction mixture by a minimum boiling point azeotropic distillation with a water immiscible organic solvent having a vapor pressure of at least 5 mm. at 100° C. and being in excess of the amount required to remove all of the water, filtering the solution of the amine in the solvent from the iron sludge and separating the amine from the filtrate.

3. A method of recovering primary aromatic amines from reaction mixtures containing the amine and iron sludge which comprises neutralizing the acid used in the reaction, dehydrating the reaction mixture by a minimum boiling point azeotropic distillation with a water immiscible organic solvent having a vapor pressure of at least 5 mm. at 100° C. and being in excess of the amount required to remove all of the water, filtering the solution of the amine in the solvent from the iron sludge, and separating the amine from the filtrate by adding a sufficient amount of inorganic acid thereto to form a salt of the amine.

4. A method of recovering primary aromatic amines from reaction mixtures containing the amine and iron sludge which comprises neutralizing the acid used in the reaction, dehydrating the reaction mixture by a minimum boiling point azeotropic distillation with a water immiscible organic solvent having a vapor pressure of at least 5 mm. at 100° C. and being in excess of the amount required to remove all of the water, filtering the solution of the amine in the solvent from the iron sludge, and separating the amine from the filtrate by stripping the organic solvent from the amine by steam distillation.

5. A method according to claim 1 in which neutralization is effected by means of calcium carbonate.

6. A method according to claim 1 in which the amine is 2-5-dichloraniline.

7. A method according to claim 1 in which the amine a 2-methyl-5-chloraniline.

8. A method according to claim 1 in which the amine is alphanaphthylamine.

9. A method according to claim 4 in which the amine is alphanaphthylamine.

10. A method of recovering primary aromatic amines from reaction mixtures containing the amine and the iron sludge which comprises neutralizing the acid used in the reaction, dehydrating the reaction mixture by a minimum boiling point azeotropic distillation with a water immiscible organic solvent having a vapor pressure of at least 5 mm. at 100° C. and being in excess of the amount required to remove all of the water, filtering the solution of the amine in the solvent from the iron sludge, concentrating the filtrate and separating the amine by crystallization.

HANS Z. LECHER.
ROBERT C. CONN.